INVENTOR.
FLOYD SMITH
BY Albert Sperry.
ATTORNEY

Patented July 9, 1946

2,403,832

UNITED STATES PATENT OFFICE 2,403,832

QUICK OPENING PARACHUTE

Floyd Smith, Manchester, Conn., assignor to Pioneer Parachute Company, Inc., Manchester, Conn., a corporation of Connecticut Application November 25, 1941, Serial No. 420,353

2 Claims. (Cl. 244—149)

This invention relates to parachutes and particularly to constructions which serve to cause the canopy of the parachute to open quickly and with certainty.

Practically all parachutes in use today are constructed and packed so that when released the air which first enters the skirt rushes into the peak of the canopy and then flows radially outward from the peak so that the canopy expands outward from the peak toward the skirt. As the canopy continues to expand the skirt is drawn upward and outward to its fully extended position. During the initial stages of opening and when the first blast of air passes into the peak of the canopy the suspension lines are subjected to tension and since the skirt is not then expanded the suspension lines tend to draw the skirt inward and limit the amount of air which can enter the canopy. Moreover, the vent which is provided in the peak of the canopy to stabilize the parachute, allows a portion of the air to escape and tends to produce a chimney effect which tends to draw the unexpanded pleats of the canopy inward between the suspension lines further limiting the amount of air which can enter the canopy and delaying or preventing complete opening thereof.

Because of these characteristics of parachutes as heretofore constructed approximately four-fifths of the time required for the canopy to open to its fully expanded position is consumed in the initial stages of the opening operation. The use of parachutes at low altitudes is therefore very hazardous.

In accordance with the present invention these objections to constructions of the prior art are overcome by providing parachutes with means located in the mid-portion of the canopy for restricting the passage of air into the peak of the canopy so that the skirt and lower portion of the canopy open to a large diameter almost immediately. Thereafter the restriction to further opening of the canopy is removed or released so that the upper portion of the canopy may expand and a large volume of air will be available immediately for this purpose by reason of the extended area of the skirt. In this way the canopy is caused to open and expand outward from the skirt rather than to expand outward from the peak of the canopy.

One of the objects of the present invention is to provide a novel type of parachute which will open quickly and may therefore be used when released at relatively low altitudes.

Another object of the invention is to provide a parachute canopy with means for causing the canopy to expand from the skirt outward instead of expanding outward from the peak, as in prior parachute constructions.

A further object of the invention is to provide a parachute with means for temporarily restricting the flow of air from the skirt of the peak of the canopy during the initial stages of opening of the parachute canopy.

These and other objects and features of the invention will appear from the following description of typical embodiments thereof which are illustrated in the drawing.

Figure 1:
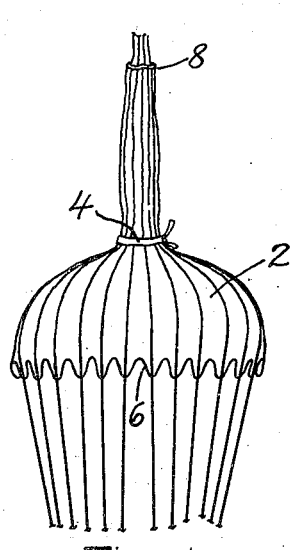
Fig. 1 is a diagrammatic illustration of a parachute canopy embodying the present invention and when partially opened.

In that form of the invention illustrated in Figs. 1 and 2 a parachute canopy 2, which may be of any suitable or conventional type, size or form, is provided with restricting means such as a break strip 4 extending about the canopy above the skirt 6 and below the peak 8 of the canopy. This break strip or restricting means is relatively short and even when stretched to its limit it is much smaller in diameter than the portion of the canopy about which it extends. The flow of air into the peak of the canopy is therefore restricted or prevented until the restricting means is released or broken.

The break strips 4 may be in the form of a band of silk, webbing, fabric or elastic material and preferably is sufficiently wide so that it will not cut into the silk or material of which the parachute canopy is formed when the skirt of the canopy is suddenly expanded. The ends of the strip 4 are tied, stitched or otherwise connected together or the strip is so formed that it will be broken or released only when subjected to a predetermined tension. In practice silk strips several inches in width and which were ruptured at tensions of from about 40 lbs. to 60 lbs. were found to operate satisfactorily. However, the strength of the break strips or releasable means may be varied considerably depending in part upon the location of the restricting means with respect to the skirt and peak of the canopy. Break strips having a strength up to 150 lbs. or more may be used.

With this construction the air which first enters the skirt of the canopy flows upward only to the point at which the restricting means 4 is located. The skirt of the canopy therefore expands almost instantaneously and the parachute assumes a shape somewhat as indicated in Fig. 1. The diameter of the skirt is then relatively large while the peak remains closed. The strength or construction of the strip or restricting means 4 is such that it will break or become released or unfastened when subjected to the tension resulting from this opening of the lower portion of the canopy so that the canopy assumes the position of Fig. 1 only momentarily. Thereafter upon release of the restricting means 4 air passes freely into the upper portion and peak of the canopy causing the whole canopy to expand to its normal diameter. This further expansion of the parachute canopy takes place very rapidly due to the relatively large area to which the skirt of the canopy has been expanded by the first impact of air entering the skirt.

Figure 2:
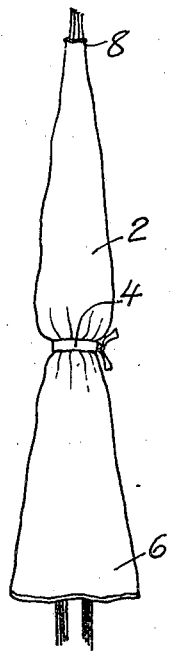
Fig. 2 is a diagrammatic illustration of a parachute canopy embodying the present invention as arranged for packing.

The location or spacing of the restricting means 4 from the skirt and peak of the canopy may be varied considerably but it has been found in practice that very satisfactory results are obtained and the parachute is caused to open very rapidly when the restricting means is located in the mid-portion of the canopy approximately half way between the peak and skirt of the canopy when pleated for folding or packing as shown in Fig. 2.

In the construction illustrated in Fig. 2 the pleated canopy is tied rather tightly with a break strip for restricting the flow of air into the peak of the canopy. In order to avoid bunching of the canopy the break strip 4 may be tied more loosely so that the pleats lie flat or a construction such as that illustrated in Figs. 3 and 4 may be used. In the latter construction oppositely located radially extending seams 10 and 12 which connect adjacent gores of the material of which the canopy is formed, are provided with loops of material 14 and 16 respectively, which preferably are stitched directly to the seams and to the suspension line 18 which pass through the seams so as to be located on the outside of the canopy. A strip of material 20 is then passed through the loop 14 which is located on the outside of the uppermost seam 10 of the pleated canopy and is passed about the canopy and through the loop 16 carried by the opposite seam 12 located on the lower surface of the pleated canopy. The ends of the strip 20 are then fastened together by suitable releasable means such as the snap fasteners 22.

Figure 4:
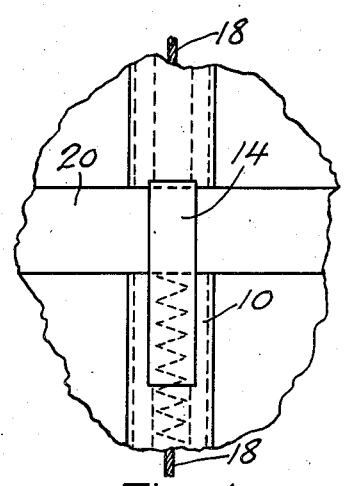
Fig. 4 is an enlarged view of a detail of the construction illustrated in Fig. 3.
Figure 3:
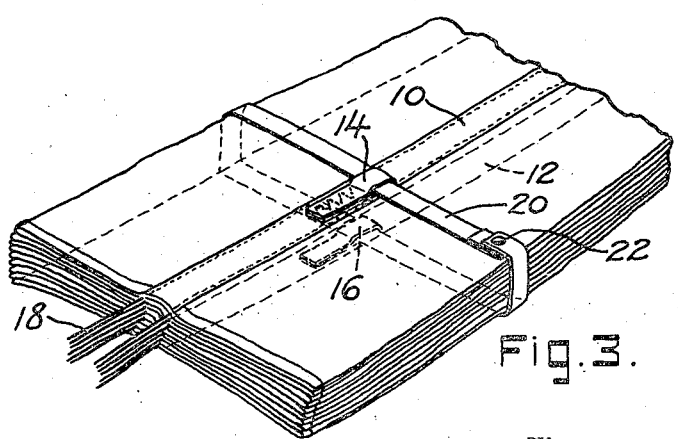
Fig. 3 is a perspective of a portion of a parachute canopy embodying an alternative form of the present invention.

The construction shown in Figs. 3 and 4 has the additional advantage of fixing the position of the restricting means or strip 20 so that it cannot slide or roll upward along the canopy instead of breaking or being released as intended. Moreover, the position of the strip is established at a predetermined point between the peak and the skirt so that the operation of the parachute will always be the same. This also positively avoids the possibility of having the restricting means accidentally placed so low on the canopy that it could prevent the parachute from opening at all.

When the restricting means illustrated in Figs. 3 and 4 are used the parachute opens to the position indicated in Fig. 1 after which the snap fasteners or other retaining means are released or pulled apart or the strip 20 is broken so as to release the upper portion of the canopy and permit air to pass into the peak and cause the canopy to expand to its full diameter.

Figure 5:
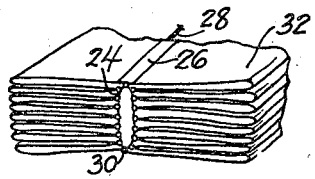
Fig. 5 is a diagrammatic sectional view of a further alternative construction embodying the present invention.

In the construction illustrated in Fig. 5 the restricting means 24 are located on the interior of the canopy and preferably are connected to the seams 26 which join the adjacent gores of the canopy and through which the suspension lines 28 extend. The break cord or other releasable means may be attached to the material of the canopy at the seams but it is preferably threaded through loops or rings 30 connected to the seams or suspension lines on the inside of the canopy. The seams are thus releasably connected together so as to provide a temporary restriction to opening of the parachute canopy.

Since restricting means located on the interior of the canopy will not cut into the material of which the canopy is formed when the canopy is expanding it is possible to use a relatively thin cord as the releasable restricting means although snap fasteners, webbing, a strip of silk or elastic material or any other suitable means may be employed. The restricting means or break cord may be applied to the canopy and threaded through the loops or rings 30 after the canopy has been pleated ready for packing, by turning back the top layer 32 to expose the rings. However, it is generally preferable to apply the break cord or restricting means to the interior of the canopy before pleating and while the canopy is suspended from the peak so that the folds thereof hang loosely downward therefrom. The canopy can then be pleated and folded with the restricting means already in place and without disturbing any of the pleats.

Figure 6:
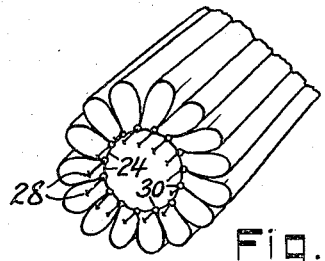
Fig. 6 is a diagrammatic sectional view through the parachute illustrated in Fig. 5 when partially expanded.

With this construction, upon opening of the parachute to a position such as that illustrated in Fig. 1 the restricting means will be ruptured or released due to the tension applied thereto and will thereafter permit the parachute to expand to its full diameter. It will be noted however that internally located restricting means do not confine the pleats of the canopy and therefore the pleats can expand partially, as shown in Fig. 6 to allow a limited amount of air to pass into the peak of the canopy prior to rupture of the break cord. In this way the folds of the canopy are shaken out and partially expanded so that upon rupture of the break cord the upper portion of the canopy opens very rapidly.

In each of the forms of the invention illustrated the skirt of the canopy is expanded first and is not thereafter reduced in diameter so that the parachute canopy is caused to expand outward skirt foremost instead of expanding outward from the peak as in prior parachute constructions. The use of restricting means as described herein further serves to cause the canopy to be opened more positively and certainly than heretofore and in a manner which prevents the suspension lines of the parachute from being thrown over the top of the canopy so that tearing and injury to the canopy and tangling of the suspension lines is reduced.

Furthermore, the momentary shock resulting from opening of the lower portion only of the canopy prior to rupture or release of the restricting means, tends to retard the descent of the user somewhat and thereby serves to diminish the subsequent shock loading of the parachute resulting from opening of the canopy to its full diameter. Moreover, because of the fact that the skirt of the canopy is open to a relatively large diameter almost instantaneously and is maintained at this large diameter deceleration of the user and shock loading of the canopy is materially reduced.

While various alternative forms of the invention have been shown in the drawing and described above the invention is by no means limited to these specific embodiments thereof. Therefore it should be understood that these forms of the invention are intended to be illustrative only and are not intended to limit the scope of the following claims.

I claim:

1. In combination with a parachute canopy a plurality of radially extending seams connecting adjacent gores of the material of which the canopy is formed, and means for increasing the rapidity with which said canopy expands on release of the parachute comprising two loops of material, one of which is connected to one of said seams and the other of which is connected to an oppositely located seam, said loop being positioned at points on the seams which are spaced from the skirt and the peak of the canopy on the outside thereof and releasable restricting means passed through said loops and about the canopy for momentarily restricting opening of the portion of the canopy above said means.

2. In combination with a parachute canopy a plurality of radially extending seams connecting adjacent gores of the material of which the canopy is formed, means for increasing the rapidity with which said canopy expands on release of the parachute comprising two loops of material, one of which is connected to one of said seams and the other of which is connected to an oppositely located seam, said loops being positioned at points on the seams which are spaced from the skirt and the peak of the canopy on the outside thereof to receive releasable restricting means, and a band of material which is much shorter than the expanded circumference of the canopy in the plane of said loops, extending through said loops and about the canopy and having the ends thereof releasably connected together.

FLOYD SMITH.